(12) United States Patent
Harbo et al.

(10) Patent No.: US 12,459,167 B2
(45) Date of Patent: Nov. 4, 2025

(54) METHOD FOR ATTACHING TWO WINDOW COMPONENTS

(71) Applicant: VKR Holding A/S, Hørsholm (DK)

(72) Inventors: Bjarne Harbo, Esbjerg (DK); Lucas Willemoes Hesselhof, Åbyhøj (DK)

(73) Assignee: VKR Holding A/S (DK)

( * ) Notice: Subject to any disclaimer, the term of this patent is extended or adjusted under 35 U.S.C. 154(b) by 1652 days.

(21) Appl. No.: 16/346,044

(22) PCT Filed: Oct. 30, 2017

(86) PCT No.: PCT/DK2017/050355
§ 371 (c)(1),
(2) Date: Apr. 29, 2019

(87) PCT Pub. No.: WO2018/077366
PCT Pub. Date: May 3, 2018

(65) Prior Publication Data
US 2019/0240877 A1     Aug. 8, 2019

(30) Foreign Application Priority Data
Oct. 31, 2016     (DK) .............................. PA201670859

(51) Int. Cl.
*B29C 37/00*     (2006.01)
*B29C 45/14*     (2006.01)
(Continued)

(52) U.S. Cl.
CPC .... *B29C 37/0082* (2013.01); *B29C 45/14311* (2013.01); *F16B 17/008* (2013.01); *B23K 26/364* (2015.10); *B29L 2031/778* (2013.01)

(58) Field of Classification Search
None
See application file for complete search history.

(56) References Cited

U.S. PATENT DOCUMENTS

| | | | |
|---|---|---|---|
| 5,475,956 A * | 12/1995 | Agrawal | B29C 66/961 |
| | | | 52/511 |
| 2006/0157890 A1* | 7/2006 | Amano | B29C 45/14434 |
| | | | 52/204.5 |

(Continued)

FOREIGN PATENT DOCUMENTS

| | | |
|---|---|---|
| CN | 101252893 | 8/2008 |
| CN | 105689912 | 6/2016 |

(Continued)

OTHER PUBLICATIONS

Non-Final Rejection dated Sep. 2, 2021 issued in U.S. Appl. No. 16/346,059, seven (7) pages.

(Continued)

*Primary Examiner* — Alison L Hindenlang
(74) *Attorney, Agent, or Firm* — Merek, Blackmon & Voorhees, LLC (57) ABSTRACT

A method for attaching a first window component to a second window component comprising the steps of: engraving a surface of the first window component with at least one first type cavity, and attaching the second window component to the first window component by introducing an anchor portion of the second window component into the least one first type cavity.

16 Claims, 6 Drawing Sheets

(51) Int. Cl.
*F16B 17/00* (2006.01)
*B23K 26/364* (2014.01)
*B29L 31/00* (2006.01)

(56) References Cited

U.S. PATENT DOCUMENTS

| | | | |
|---|---|---|---|
| 2009/0155736 A1 | 6/2009 | Vekoerrer | |
| 2015/0247071 A1* | 9/2015 | Caillie | B32B 37/04 428/420 |
| 2016/0052202 A1* | 2/2016 | Nishikawa | B29C 66/1122 403/265 |
| 2016/0167353 A1* | 6/2016 | Fan | B29C 66/21 216/39 |

FOREIGN PATENT DOCUMENTS

| | | |
|---|---|---|
| DE | 2443098 | 3/1975 |
| DE | 202014005241 | 8/2014 |
| DE | 10 2013 211905 | 12/2014 |
| EP | 1355016 | 10/2003 |
| EP | 1681399 | 7/2006 |
| EP | 2055860 | 5/2009 |
| WO | WO 99/59793 A1 | 11/1999 |
| WO | WO 2005/008013 A1 | 1/2005 |
| WO | WO2013/050045 | 4/2013 |
| WO | WO2013/050043 | 11/2013 |

OTHER PUBLICATIONS

U.S. Appl. No. 16/346,059, filed Apr. 29, 2019.
PCT/DK2017/050356 International Search Report, Jan. 1, 2018, 2 pages.
PCT/DK2017/050355 International Preliminary Report on Patentability, Oct. 19, 2018, 7 pages.
PCT/DK2017/050355 International Search Report, Jan. 1, 2018, 2 pages.
Office Action dated Jul. 30, 2020 issued in connection with Chinese Application No. 201780066790.5 and English language translation thereof, 16 pages.
European Search Report dated Aug. 26, 2020 issued in connection with European Patent Application No. EP20181428, 2 pages.
"Joining of Metal-Plastics-Hybrid Structures Using Laser Radiation by Considering the Surface Structure of the Metal," Journal of Polymers, vol. 2016, Jul. 19, 2016, 11 pages.

* cited by examiner

Fig. 19

METHOD FOR ATTACHING TWO WINDOW COMPONENTS

FIELD OF THE INVENTION

The present invention relates to a method for attaching window components, particularly roof window components.

BACKGROUND ART

The attachment of window components in particular attachments of window components made from different materials, such as plastics and metals, have traditionally been obtained by mechanical fasteners such as screws, nails or rivets.

The use of mechanical fasteners for attaching two window components is advantageous, because such attachments are able to withstand relatively large forces such as pulling, pushing, and tugging from a user, but also environmental induced stress such as changing weather conditions and wind causing vibrations in the window installation.

In the context of the application, window components should be understood as components having a well defined structure for an application in a building window, such as a roof window. Window components include but are not limited to claddings, covers, frame, sash, window pane, top box, hinges, hinge connections, locks, locking mechanisms, fittings, etc.

A drawback of using mechanical fasteners is that the fasteners are often visible and thereby reduces the overall aesthetic perception of the user of the window.

Additionally, fasteners often deform the component which they penetrate, either during the manufacturing or installation processes or in use. Hence, mechanical properties of the window component may be compromised. Furthermore, the fasteners induce an additional way for water to enter the interior of the window which can cause problems with rust and corrosion.

An alternative to attaching components by means of mechanical fastening elements is to use adhesives to connect the window components. This solution however is rarely suitable for attaching window components as the attachment provided by adhesives does not have the peel and impact strength to endure the continuous stress induced by the actions of the users or the stress induced by changing weather condition and vibration caused by wind gust. For example, during summer time a metal surface on the exterior side of a window may easily reach 100 degrees Celsius which causes most adhesives to fail. Furthermore, compatibility of two different surfaces and an adhesive may be a complex matter.

On this background it is therefore an object of the invention to provide a method for attaching a first window component to a second window component which does not suffer from the above-mentioned drawbacks, while at the same time providing an aesthetically pleasing finish for the user.

SUMMARY OF THE INVENTION

According to the invention, this is solved by a method comprising the steps of:
a) engraving a surface of the first window component with at least one cavity by subjecting the first window component to a laser beam at a polar angle, α1; and b) attaching the second window component to the first window component by introducing an anchor portion of the second window component into the least one cavity.

The at least one cavity is engraved into the surface of the first window component by applying a laser beam on the surface, whereby material is removed to form a cavity. The cavity may be provided as a groove by moving the laser beam across the engraved surface.

Throughout this description, spherical coordinates are used when describing the direction from which the incident laser beam engraving a cavity hits the surface, which in turn also describes the direction which the engraved cavity extends into the engraved surface. The origin for the spherical coordinates being the point on the surface where the laser beam is directed.

The polar angle is therefore defined as the angle between the laser beam and the normal vector of the surface that is to be engraved at the point on the surface where the laser beam is directed. The polar angle therefore defines the direction in which a cavity extends into the surface in relation to the normal vector, i.e. the angle between the central axis of the cavity and the normal vector of the surface.

An azimuth angle may also be defined for the one or more cavities, as the angle between the incoming laser beam projected onto the surface and a common reference direction in the surface plane. The azimuth angle therefore describes the direction which a cavity extends when viewed from above.

With a method of this kind, the anchor portion is able to fill the at least one cavity to provide the window components with a durable, strong attachment between them. Meanwhile, this attachment method does not require that a screw or similar visible attachment element is inserted into the window components and the visible surface may therefore appear aesthetically pleasing finish to an observer looking at an installed window.

Additionally, the method of the invention may be particularly advantageous when connecting second window components to first window components made from glass or metal, where screws and other fastening means requiring a hole to be drilled cannot be used.

The anchor portion is introduced into the cavities, while the anchor portion is in a fluid state, after which it can solidify to shape itself according to the cavities so that the cavities can retain the anchor portion and thereby the second window component.

With such a method, a strong attachment between the first and second component is achieved as the cavities of the engraved surface of the first component providing a larger attachment surface than a plane surface. Foremost, the strength of the attachment is due to each cavity forming a separate locking joint with the anchoring portion of the second window component. Hence, if some of the locking joints are destroyed there are still multiple locking joints to maintain the two window components connected.

In an embodiment of the invention, the at least one cavity is engraved at a polar angle, $α_1$, different from 0 degrees, preferably between 10 and 80 degrees, more preferably between 15 and 70 degrees, most preferably between 20 and 60 degrees, so that the at least one cavity extend into the engraved surface at an angle in relation to the normal vector of the engraved surface By making the at least one cavity angled in relation to the normal vector of the surface, the attachment of the two window components has been remarkably improved. This is because the cavity may fail in retaining the anchor portion if subjected to forces parallel with the central axis of the cavity. An angled cavity will therefore retain the anchor portion better than a cavity engraved orthogonally into the connection surface, when the window component is subjected to a force in a direction orthogonally away from the connection surface.

In an embodiment of the invention, step a) further comprises engraving the surface with at least one further cavity by subjecting the first window component to a laser beam from a different direction than that used to engrave the at least one cavity, such that the at least one cavity and the at least one further cavity does not extend into the surface in parallel directions.

As described above, a cavity is most likely to fail at retaining the anchor portion when the attached window components are subjected to pull forces parallel with the central axis of the cavity. By providing at least one further cavity that extends into the surface in a direction that is not parallel with direction of the at least one cavity and also introducing the anchor portion into the at least one further cavity the attachment between the first and second window components can be improved even further, as a pull force applied on the attached window components can never be parallel with all of the cavities.

In an embodiment of the invention the at least one cavity is and the at least one further cavity are engraved at the same polar angle, $\alpha_1$, but at different azimuth angles. This will achieve the above-described benefits of having multiple cavities extending in different directions into the engraved surface. Furthermore, as the polar angle is kept constant for both the at least one cavity and the at least one further cavity, the engraving process can be done by a fixedly mounted laser and planar and rotational movement of the object to be engraved, thereby reducing the complexity of the equipment needed to perform the engraving.

In an embodiment of the invention, the at least one further cavity is engraved by a laser beam at an azimuth angle of 80 to 100 or 170 to 190 degrees different from the laser beam engraving the at least one cavity, preferably with the same polar angle as the at least one cavity. This will provide at least one further cavity which, when viewed from above, extends perpendicular or anti-parallel to the at least one cavity.

By providing at least one further cavity that is engraved at an azimuth angles of 80 to 100 or 170 to 190 degrees in relation to the engraved direction of the at least one cavity, the orientation of the at least one cavity and the at least one further cavity will function as a barb for each other giving a superior attachment between the first and the second window component. This is, as described above, due to the cavities being weakest at retaining the anchor portion, when a force is applied in a direction parallel with the cavity. By providing cavities extending in different directions when viewed from above, it will never be possible to apply a force on the window components, which is parallel with all of the cavities.

It should be noted, that the at least one cavity and further cavity may be provided as grooves extending across the surface. In this case, the at least one cavity and the at least one further cavity may intersect to form a continuous pattern which, even though it forms one connected cavity, may still be regarded as several cavities.

In another embodiment of the invention, the method comprises an additional step of pressing the first window component and the second window component against each other during and/or subsequently after step b).

The additional step of pressing the two components together may further improve the attachment further as it ensures that the anchor portion is fully introduced into the at least one cavity and if present the at least one further cavity. Furthermore, it may reduce the manufacturing time of the window component obtained by the first aspect of the invention.

The term "during" in the context of the present application should be understood as an action that is performed throughout the whole step of interest or only in a part of the step of interest. As an example "during" in the context of the additional step of pressing together the two window components, the pressing may be done throughout whole step b or only in a part of step b.

In another embodiment of the invention, the at least one cavity and/or at least one further cavity form a pattern in the surface of the first window component, the pattern is preferably chosen from a mesh, grid, circle or a spiral.

In an embodiment, the pattern may be provided by having multiple non-connecting cavities i.e. there is a distance S between a pair of neighboring cavities in the surface of the first window component. The cavities are therefore provided in a predetermined manner that results in a desired pattern.

It should be noted that when a cavity is provided as a groove extending across the surface, it may be engraved from different polar and/or azimuth angles along the length of the groove, whereby the cavity may extend into the surface in different directions depending on the position along the length of the groove. In such embodiments the at least one cavity may be in the form of a groove forming a spiral pattern or a pattern of concentric circles. When viewed from above, such a grove will extend into the surface at different directions so that it may function as its own barb, i.e. a pull parallel with the direction which the cavity extends into the surface at one point along the length of the groove, will be countered by other parts of the groove, as the pull will not be parallel with the cavity at these points.

Therefore, in an embodiment of the invention the at least one cavity is engraved as a groove extending a length across the surface, and in a further embodiment, the polar and/or azimuth angle is changed along the length of the groove, so that the extends into the surface at varying angles.

Alternatively, in an embodiment, the pattern is provided on the engraved surface by one continuous cavity. In a further embodiment the pattern is obtained by a combination of continuous and non-connecting cavities.

Generally, window components are made from metal, glass, plastics, composites such as fibre-reinforced polymers, or a combination hereof. Hence, in an embodiment of the invention, the first window component is made from metal, glass, or plastic. The method according to the invention is particularly advantageous in the scenario, where the first window component is either glass or metal, and the second window component is plastics, as these hybrid connections do not allow the use of welding as an attachment method.

In a preferred embodiment, the first window component is a sash covering member. The sash covering member is adapted to cover the exterior portion of the window sash to protect the sash against rain and to provide an aesthetically pleasing finish to the customer. The sash covering member is often made from thin layer of aluminium extruded or bend as a profile. The profile is then attached to a plastic snap-lock, i.e. a second window component, by screwing a screw through the outer surface of the sash covering member and into the plastic snap-lock. As the outer surface of the sash covering member presents part of the visible surface of the window, the screw head will be clearly visible which has been found to be a nuisance to the customers.

In another preferred embodiment the first window component is a window pane. Providing attachments between glass and other window components are generally only possible by using adhesives. However, a traditional adhesive interface cannot achieve the required attachment strength for some purposes, which has discouraged the application of plastic window components attached to glass window components.

In a further preferred embodiment, the first component is a wooden core frame with an outer plastic shell or a composite of a polymer matrix reinforced with fibres such as glass, carbon, or the like.

In an embodiment of the present invention the laser engraving is performed by at least two lasers, wherein the at least two lasers provide laser beams with different polar and/or azimuth angles on the surface of the first window component.

By using at least two lasers, the lasers may be mounted in fixed positions at fixed angles so that the first window component may be moved in relation to the lasers, whereby a first laser may engrave the at least one cavity and a second laser may engrave the at least one further cavity. This in turn requires a less elaborate production setup, thereby reducing the manufacturing costs of the window. Furthermore, the engraving of the surface of the first window component may be completed quicker, thereby reducing manufacturing time.

The anchor portion may in an embodiment form part of the second window component before step b, i.e. the anchor portion may be integral with the second window component. This may be achieved by making the second window component of a polymer, preferably a thermoplastic polymer, or other materials which can be melted to be introduced into the cavities and then solidified after being melted.

In an embodiment of the invention, the melting of the anchor portion of the second component is accomplished by laser, heat, or ultra-sound.

In an embodiment of the invention, the melting of the anchor portion, is performed by heating the first window component, and during the heating or subsequently after the heating of the first window component pressing the second component against the heated engraved surface of the first window component.

In an embodiment of the invention, wherein the anchor portion is a thermoplastic polymer, and the step of introducing the anchor portion into the engraved surface in step b, is performed by melting the anchor portion of the second component and allowing the melted anchor portion to settle into the cavities of the engraved surface.

In a further embodiment both the first component and the anchoring portion is heated before and/or during step b. This may ensure that the anchor portion remains fluid until it is fully introduced into the at least one cavity and if present at least one further cavity, i.e. does not solidify before step b is completed.

In an alternative embodiment, the second window component is moulded directly on the engraved surface, whereby the anchor portion is introduced into and formed in the engraved surface.

The advantage of using a pre-fabricated second window component and melting the anchor portion during assembly is that the second window component may be manufactured in a separate production line or acquired from an outside distributor.

In an embodiment of the invention, the moulding of the second window component to the first window component is performed by injection moulding.

Some thermoplastics may become brittle or weakened if heated above the glass-transition temperature without being heated to the melting temperature. Although the anchor portion is heated above the melting temperature, a transition portion of the second window component, i.e. the portion in proximity with the anchor portion, may be weakened by the melting/heating process. By moulding the second window component directly on the surface of the first window component a uniform temperature profile is achieved throughout the material reducing the brittleness of second window component.

Furthermore, by injection moulding the second window component directly on the surface of the first window component, it is ensured that the anchor portion is fully introduced into the cavities.

In an embodiment of the invention, the anchor portion is an adhesive provided in a layer between the engraved surface of the first window component and the second window component.

By introducing an adhesive layer into the cavities of the first element the attachment will be a combination of mechanical anchoring and adhesives bonds between the first and the second window component. The result of having an attachment provided with mechanical anchoring and adhesive bonds improves the overall impact and in embodiments, wherein the anchor portion is provided by an adhesive, also peel strength of the attachment.

In a further embodiment the adhesive is selected from the group of polyurethane based adhesives, epoxy based adhesives, or acrylic based adhesives, and/or light curable adhesives, preferably UV curable adhesives.

By using light curable adhesives, the curing process may be controlled more accurately. The only requirement for applying light curable adhesives is that one of the window components has to be transparent for light in the frequency used to cure the adhesive.

In an embodiment according to the invention, the surface of the second window component facing the adhesive layer is also subjected to step a. In this case, each variation of step a as described for the first window component in other embodiments of the invention may also be applied equally to the second window component.

Applying step a on the surface of the second window component is mostly advantageous, when the anchor portion is provided by an adhesive. In such scenarios, the adhesive may form a stronger connection with the second window component.

In one embodiment the depth (D) of the at least one cavity is 100 to 1000 µm, preferably 200 to 800 µm, more preferably 300 to 700 µm.

With an engraving depth of this magnitude, the method may be applied to thin pieces of metal thereby reducing the weight of the covering assembly including the covering elements.

In one embodiment the width of the at least one cavity is 10 to 100 µm, preferably 20 to 80 µm, more preferably 30 to 70 µm.

The cavities should be wide enough for the fluid anchor portion to be introduced during manufacturing, while also not being so wide that the cavity fails at retaining the anchor portion. In general, the wider the cavities are, the fewer the number of joints formed between the anchor portion and the engraved surface per area.

BRIEF DESCRIPTION OF DRAWINGS

The invention will be described in more detail below by means of non-limiting examples of embodiments and with reference to the schematic drawing, in which:

FIG. 16b shows close-up of the window shown in FIG. 16a, FIG. 17 shows a mounting bracket for mounting a screening arrangement adapted to be attached using the method of the invention, the mounting bracket comprising an anchor portion adapted for being liquefied during assembly.

DETAILED DESCRIPTION OF THE INVENTION

In the following, embodiments of the invention will be described in further detail. Each specific variation of the features can be applied to other embodiments of the invention unless specifically stated otherwise. Directional terms such as "upper", "lower", "right", "left" etc. relate to the position shown in the drawings.

In the following detailed description, reference will be made to first, second, and third type cavities 12, 13, 14. These references are used to denote cavities of different polar and/or azimuth angles and/or length (L). Although the figures show several identical cavities it is contemplated that the polar and/or azimuth angles can be chosen independently for each cavity and may by different from or identical to other cavities. Furthermore, although the examples only show three types of cavities 12, 13, 14, the engraved surface 11 may comprise additional types of cavities.

Figure 1:
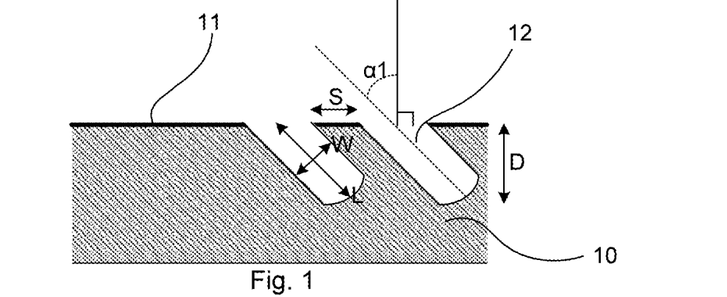
FIG. 1 shows a cross sectional view of a schematic drawing of an embodiment of the engraved surface of the first window component.

FIG. 1 illustrates a first cross sectional view of first window component 10. The engraved surface 11 of the first window component 10 have been subjected to a laser beam according to the present invention from a direction that is angled in relation the normal vector of the surface of the first component, i.e. the polar angle of the direction is different from 0 degrees. The polar angle is denoted as the angle α and is preferable between 10 to 80 degrees, more preferably 30 to 70 degrees.

The laser engraving step provides the engraved surface of the first window component 10 with a first type of cavities 12. The first type of cavities 12 extend a length (L) from the engraved surface 11 of the first component 10 into the first window component 10 in a direction that is preferably not parallel with the normal vector 40 of the engraved surface 11.

The length (L) will depend on the kind of window components to be connected and the required strength of the attachment. For most applications a length (L) in the range 100 to 1000 μm is ideal. The distance S is the distance between two neighboring cavities 12. It is contemplated that the distance S between two neighboring cavities may be independently for each pair of neighboring cavities.

Figure 2:
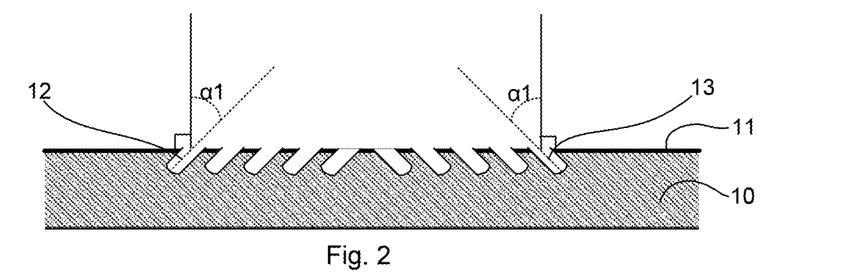
FIG. 2 shows a cross sectional view of a schematic drawing of an embodiment of the engraved surface of the first window component illustrating a first type of cavities and a second type of cavities arranged symmetrically around a center axis.
Figure 3:
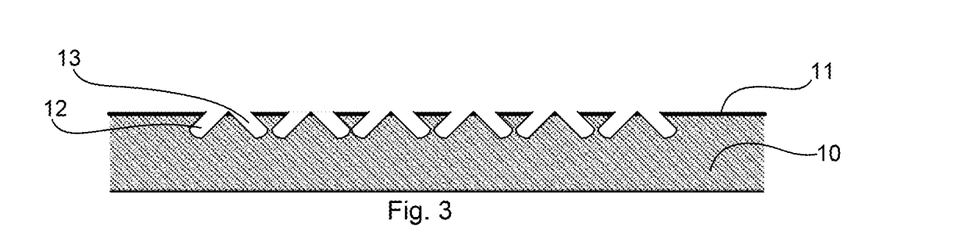
FIG. 3 shows a cross sectional view of a schematic drawing of an embodiment of the engraved surface of the first window component, wherein the first type of cavities and second type of cavities are arranged alternately in pairs.
Figure 4:
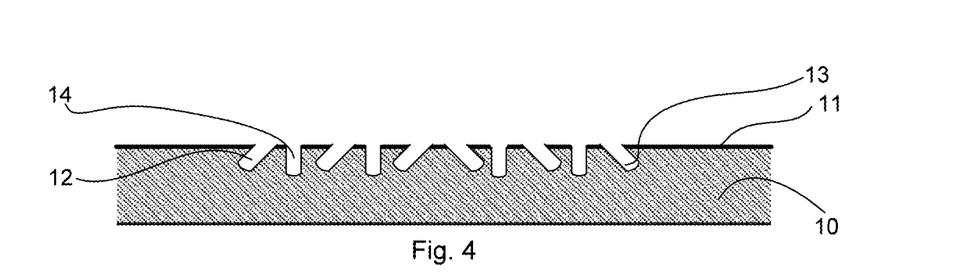
FIG. 4 shows a cross sectional view of a schematic drawing of an embodiment of the engraved surface of the first window component illustrating a third type of cavities.

Referring now to FIG. 2 to FIG. 4, three embodiments of the engraved surface 11 having different arrangement of the cavities 12, 13, 14 are illustrated. In FIGS. 2 and 3 the engraved surface 11 comprises a plurality of first type cavities 12 and second type cavities 13. In the shown example, the first and second type cavities 12, 13 are engraved at the same polar angle, $α_1$, but at azimuth angles that are 180 degrees different. The first type cavities 12 extend to the "left", and the second type cavities 13 extend to the "right". However, it is contemplated that "right" or "left" is a simplification when the first and second type cavities 12, 13 are seen in a two-dimensional drawing, and the direction of the first and second type cavities 12, 13 may extend into the plane or out of the plane.

By having first and second type cavities 12, 13 that does not extend in a parallel direction into the engraved surface 11, the attachment achieved between the first and the second window components 10, 20 has an improved peel and/or impact strength.

The first and second type of cavities 12, 13 may be arranged with a high degree of freedom which is also illustrated by FIG. 2 and FIG. 3. In the embodiment in FIG. 3, the first and second type of cavities 12, 13 are arranged successively in blocks and in the embodiment in FIG. 3, the first and second type of cavities 12, 13 are arranged alternately.

It is contemplated in an embodiment of the invention, that the first, second and/or third type cavities 12, 13, 14 may be arranged in a combination of blocks and alternately.

In a further embodiment of the invention, wherein the first, second and/or third type cavities 12, 13, 14 are arranged alternating on the engraved surface 11, the distance S between the neighboring first, second and/or third type cavities 12, 13, 14 may be ≥0.

FIG. 4 shows an embodiment similar to the embodiments in FIG. 2 and FIG. 3. The engraved surface 11 is provided with a third type cavity 14 that is parallel with the normal vector of the engraved surface 11 of the first window component 10, i.e. the third type cavities 14 have been engraved at a polar angle of 0 degrees.

Figure 5:
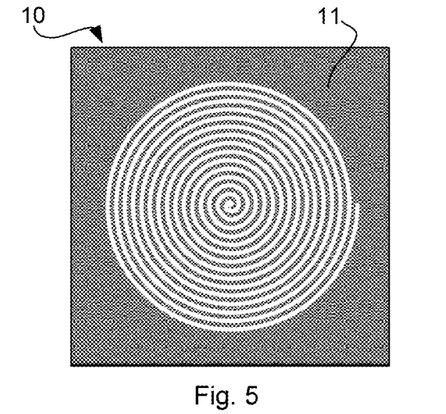
FIG. 5 shows an embodiment of a part of the surface of the first component, wherein an engraved continuous cavity forms a spiral pattern on the surface.

Referring now to FIG. 5, an embodiment of the engraved surface 11 of the first window component 10 from a top view is shown. The engraved surface 11 has been provided with one continuous cavity that forms spiral.

Generally, the spiral may in an embodiment comprise both a first, second and/or third type cavity 12, 13, 14, wherein the distance between each neighboring first, second and/or third type cavity is ≥0.

Figure 6:
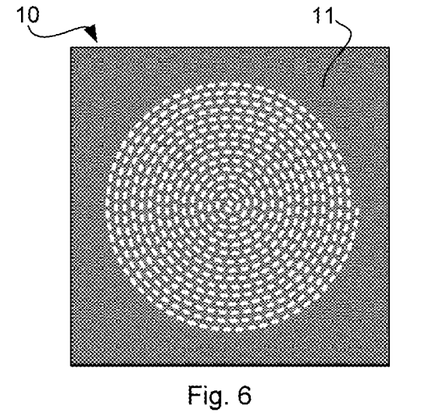
FIG. 6 shows an embodiment of a part of the surface of the first component, wherein a series of engraved cavities forms a spiral pattern on the surface.

Referring now to FIG. 6, an embodiment similar to the embodiment in FIG. 5 is shown. The spiral in this embodiment is formed by a series of non-connecting cavities. The cavities may comprise first, second and or third type cavities 12, 13, 14 extending into the surface at different polar and/or azimuth angles. Furthermore, the first, second and third type cavities 12, 13, 14 may be arranged in blocks, alternating, or a combination thereof.

Figure 7:
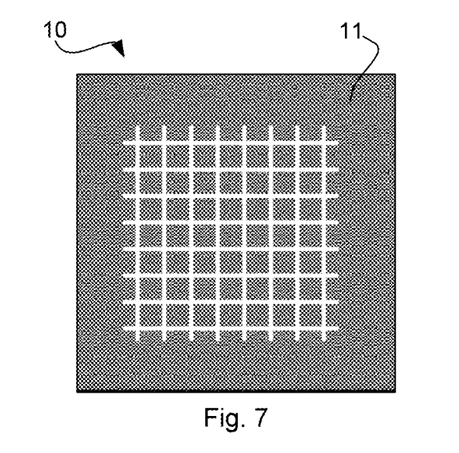
FIG. 7 shows an embodiment of a part of the surface of the first component, wherein several engraved intersecting cavities form a mesh pattern on the surface.

Referring now to FIG. 7, an embodiment of the engraved surface 11 of the first window component 10 from a top view is shown. The engraved surface 11 is provided as a mesh of continuous cavities. Thereby, an anchor portion of the second window component 20 may be provided on a part of the mesh or may cover the total area of the mesh. Because the engraving process is relatively non-invasive and does not weaken the surface notably, the first window component 10 may be engraved on a larger surface than is covered by the second window component 20. This allows some room for error in the production line.

Generally, the second window component 20 may also cover an area greater than the area provided by the mesh or any pattern according to the invention. The depth of and the surface area covered by the cavities 12, 13, 14 is determined on the required attachment strength and how large an area the second component 20 covers. In some instances, it may only be needed to engrave an outer periphery of a connection junction between the first and second window components 10, 20.

Figure 8:
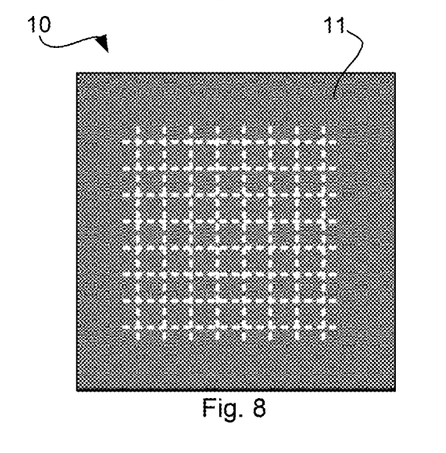
FIG. 8 shows an embodiment similar to the one shown in FIG. 7, wherein the continuous cavities have been replaced with a series of nonconnected cavities.

Referring now to FIG. 8 that shows a pattern of a mesh engraved in the surface 11 of the first window component 10 similar as in the embodiment in FIG. 8. The cavities on the engraved surface 11 of the first window component 10 are provided as non-connecting cavities, i.e. there is a distance S between each cavity.

Figure 9:
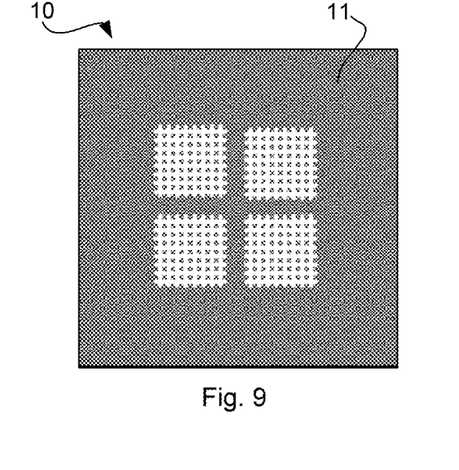
FIG. 9 shows an embodiment of a part of the surface of the first component, wherein several engraved intersecting cavities forms four mesh patterns on the surface.

Referring now to FIG. 9, a plurality of mesh patterns is shown. The second window component 20 may be attached on the engraved surface 11 so that the second window component 20 is in contact with each mesh. However, this it is not a requirement.

It is contemplated that a plurality of second window elements 20 can be attached to one first window component 10. By each second window element 20 having an anchor portion introduced into respective cavities on the engraved surface 11.

Figure 10:
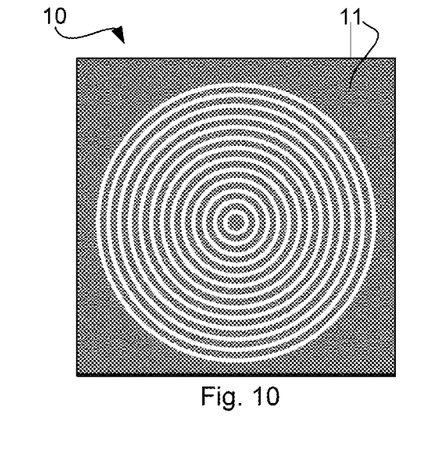
FIG. 10 shows an embodiment of a part of the surface of the first component, wherein several engraved cavities forms a pattern of concentric circles on the surface.

FIG. 10 shows an embodiment of an engraved surface 11 according to the invention. The pattern on the engraved surface 11 is provided by concentric circles that vary in diameter. In the shown embodiment, wherein the engraved circular cavities are viewed from above the direction which the cavities extend into the surface cannot be seen. In a preferred embodiment, each the circular cavities are rotationally symmetric, such that the cavity has been engraved at a constant polar angle and a changing azimuth angle. Generally, a pattern of concentric circles may comprise first, second and/or third type of cavities 12, 13, 14.

Figure 11A:
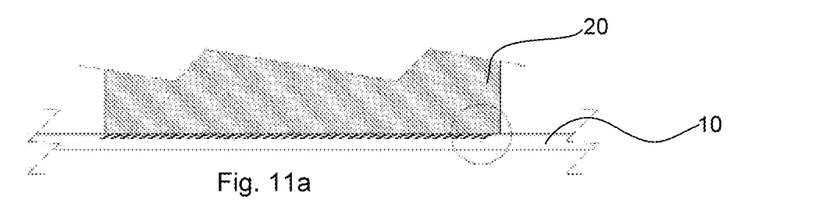
FIG. 11a shows a cross sectional view of a schematic drawing of an embodiment a window component obtained by the method according to the invention, wherein the anchor portion is a thermoplastic polymer.
Figure 11B:
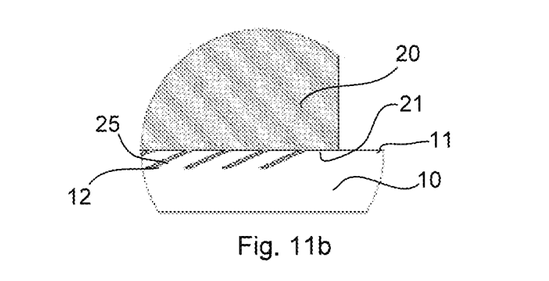
FIG. 11b shows an enlarged cross sectional view of a part of the embodiment 11a, FIG. 12a shows a cross sectional view of a schematic drawing of an embodiment wherein the anchor portion is an adhesive provided between into cavities of the first window component and the second window component.

FIGS. 11a and 11b show a schematic drawing of the attachment between a first window component 10 and a second window component 20 obtained by the present invention. The attachment has been obtained by providing an engraved surface 11 of the first window component 10, the engraved surface comprises at least one first type cavity 12, attaching the second window component 20 to the first window component 10 by introducing an anchor portion 25 of the second window component 20 into the at least one first type cavity to provide an attachment between the first window component 10 and the second window component 20, wherein the step of engraving the surface 11 of the first window component 10 is performed by subjecting the first window component 10 to a laser beam at a polar angle different from 0 degrees, i.e. not parallel with the normal vector of the engraved surface 11.

The engraved surface 11 is provided with a plurality of first type cavities 12. The second window component 20 is provided with an anchor portion 25 having a surface 21 facing the engraved surface 11. In this embodiment the anchor portion 25 is made from a thermoplastic polymer and is introduced into the engraved surface by heating the first window component 10 and placing the second window component 20 on the engraved surface 11. Subsequently allow the anchor portion 25 to melt and settle in the first type cavities 12 of the engraved surface 11.

Generally, the anchor portion of the second window component may be placed on the engraved surface of the first window component before providing heat to the first window component and/or the second window component.

In another embodiment of the invention the anchor portion 25 of the second window component 20 may be directly heated by heating means such as but not limited to heat, laser welding, or ultrasound.

Figure 12A:
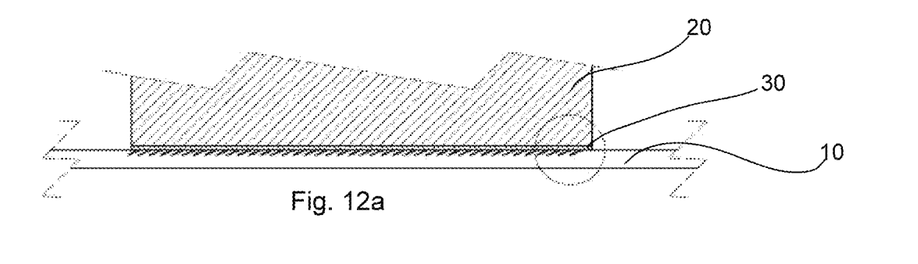
Figure 12B:
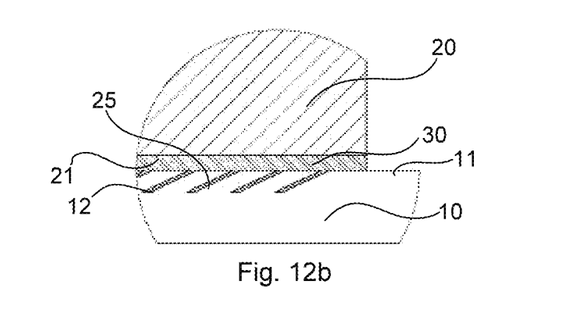
FIG. 12b shows an enlarged cross sectional view of a part of the embodiment 12a, FIG. 13 shows a cross sectional view of an embodiment of the invention, wherein a first window component has been subjected to laser engraving and the anchor portion is an adhesive layer provided between the first and second window component.

Referring now to FIGS. 12a and 12b, an embodiment of the invention, wherein the anchor portion 25 is provided as an adhesive layer 30 between the surface 21 of the second window component 20 and the engraved surface 11 of the first window component 10 is shown.

The adhesive layer 30 is UV curable adhesive that is introduced into the cavities 12, 13. The adhesive is activated and subsequently the surface 21 of the second component 20 is pressed against the engraved surface 11 of the first window component 10 until an attachment is formed.

In general, the adhesive need not be UV-curable, this is chosen for enhanced control of the curing process. The important properties of the adhesive are mainly its strength and adhesion to the materials from which the connection element 20 and the covering element 10 are made. The adhesive should however also, when fluid, have a viscosity which allows it to enter the cavities 12, and, when cured, have a temperature tolerance of at least approx. −20 to 100° C., preferably −40 to 120° C. such that it can withstand both winter and summer conditions.

An example of an applicable adhesive is DELO-PHOTO-BOND® MF4055 which is a light-curable adhesive with the above mentioned properties. As mentioned before, the use of light-curable adhesives requires that at least one of the first and second window components 10, 20 is transparent to light of the relevant wavelength, i.e. the material of one of the first and second window components 10, 20 should have a sufficiently high transmission coefficient to allow the light to reach the adhesive.

Figure 13:
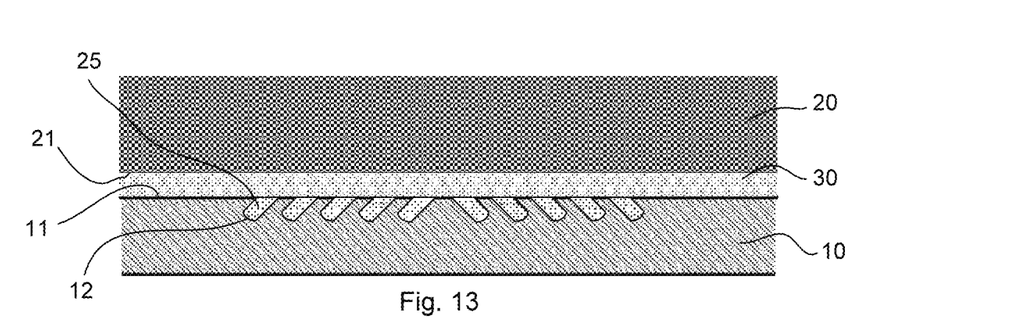

Referring now to FIG. 13, a schematic illustration of an embodiment of the invention, wherein the engraved surface 11 of the first window component 10 is provided with first and second type cavities 12, 13 that are arranged in blocks is shown. The first window component 10 is made from metal and the second window component 20 is made from plastic. Between the second window component 20 is provided with an anchor portion 25 made from an adhesive layer 30.

Figure 14:
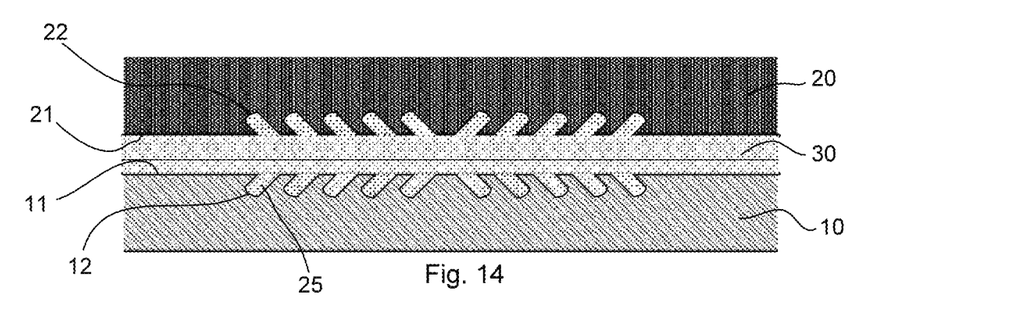
FIG. 14 shows a cross sectional view of an embodiment of the invention, wherein a first and second window component have been subjected to laser engraving and the anchor portion is an adhesive layer provided between the first and second window component.

Referring now to FIG. 14, a schematic illustration of an embodiment of the invention is shown. The window component is provided by a first window component 10 made from glass, such as a window pane, having an engraved surface 11 comprising first and second type cavities 12, 13. A second window component 20 made from plastic is provided with a surface 21 that have been subjected to a laser engraving step according to the invention. An anchor portion 25 made of an adhesive layer 30 is provided between the two engraved surfaces 11, 21.

Figure 15:
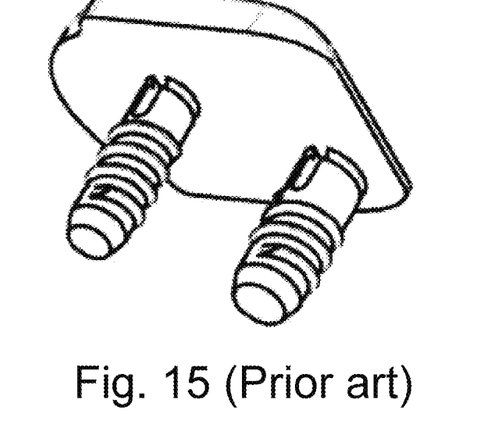
FIG. 15 shows a mounting bracket for a screening arrangement with traditional attachment elements.

An exemplary use of the method of the invention, wherein a second window component in the form of a mounting bracket for a screening arrangement is attached to a first window component in the form of a window frame, is described in the final part of this description. As shown in FIG. 15 such mounting brackets have traditionally been attached using integral dowels. The two integral dowels of the mounting bracket of the prior art are arranged in opposite corners of the mounting bracket to provide the mounting bracket with a secure attachment to the window frame, such that it can withstand the stress and torque subjected on it when the roller blind is operated.

The mounting bracket is adapted for being attached to a side frame member of a stationary or movable window frame. When attached, the mounting bracket is adapted for, in cooperation with a mirror symmetric mounting bracket attached to the opposite side frame member, mounting a screening arrangement (not shown). The functional portion of the mounting brackets, i.e. the portion adapted to project above the surface of the window frame to engage the screening arrangement, is mirror symmetrical. This allows a mounting bracket to be placed and serve its function on either of the side frame members.

Figure 16A:
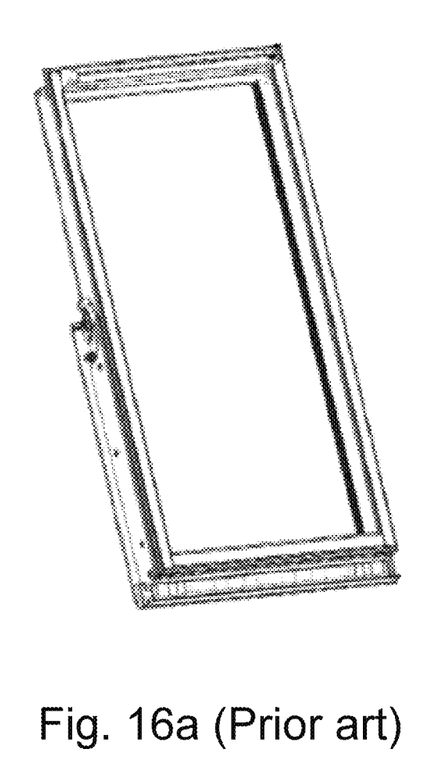
FIG. 16a shows a window with drilled holes for receiving the attachment elements of the mounting bracket shown in FIG. 15.
Figure 16B:
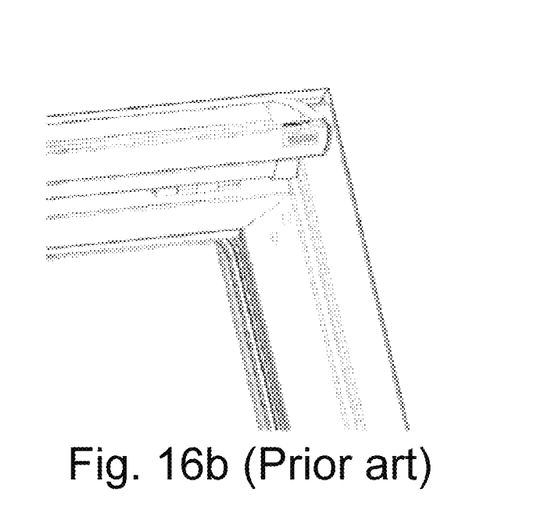

The attachment between a mounting bracket and a window frame has to be quite durable to support a screening arrangement, such as roller blinds, which is frequently subjected to pulls when the screening arrangement is either shut or opened. To provide such an attachment the mounting bracket of the prior art comprises two integral dowels arranged in opposite corners of a connection surface of the mounting bracket. This arrangement ensures that the forces subjected upon the mounting bracket are properly distributed. However, as can be seen in FIGS. 16a and 16b showing a window frame, the two oppositely arranged dowels present some issues when preparing the frame attachment with the pair of mounting brackets.

To receive the two dowels, a pair of corresponding holes has been drilled into the frame. While the functional portion of a mounting bracket is mirror symmetrical, the arrangement of the two dowels is not. This means that the holes have to be drilled into the side frame member in certain positions, depending on whether the side frame member is a left or right side frame member.

The method of the invention provides an alternative attachment which allows a mounting bracket to be attached to a window frame without using dowels and with a minimal amount of invasive penetration of the window frame.

Figure 17:
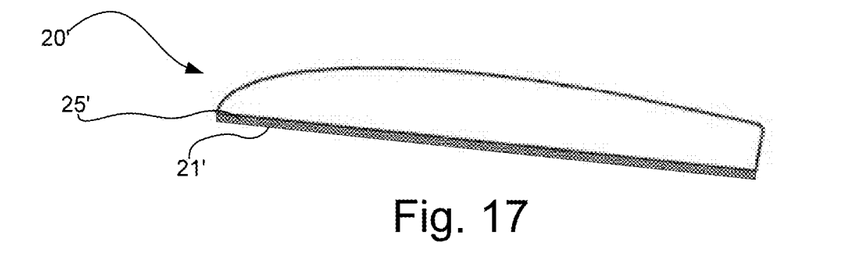

FIG. 17 shows a side view of a mounting bracket 20' made to be attached using the method of the invention. The mounting bracket 20' according to the invention is produced without any attachment elements protruding from the connection surface 21' of the mounting bracket 20', the connection surface of the mounting bracket 20' being the surface adapted to face the side frame member 10'. Instead of outwards projecting attachment elements, the mounting bracket 20' comprises an anchor portion 25'. In the shown embodiment, the anchor portion 25' is an integral portion of the mounting bracket 20'.

The functional portion of the mounting bracket 20', that is the portion projecting above the connection surface to engage the screening arrangement, is in itself well-known and is for instance the subject of Applicant's published international application no. WO 2005/008013 A1 and several other patent publications. A commercially available variety is for instance the pre-installed mounting brackets which come as standard on every window of the brand VELUX®.

The anchor portion 25' is made from a thermoplastic so that it can be melted, reshaped, and solidified. In most embodiments, the entire mounting bracket 20' will be molded from the same material, but it could be conceived to mold the functional portion and the anchor portion 25' of a mounting bracket 20' in different materials provided that the two materials can bond at the interface.

The anchor portion 25' is adapted for being liquefied during assembly of the window frame, so that it becomes possible to introduce it into one or more angled cavities 12' which are engraved into a connection surface of the side frame member 10' as will be described below.

The anchor portion 25' may be brought into a fluid state by melting the anchor portion 25' without melting the functional portion of the mounting bracket 20', i.e. locally heating the mounting bracket 20'. This will be possible in embodiments where the mounting bracket 20', or at least the anchor portion 25', is made from a thermoplastic such that the anchor portion 25' will regain a solid form after being introduced into the at least one cavity 12' in the fluid state.

Figure 18:
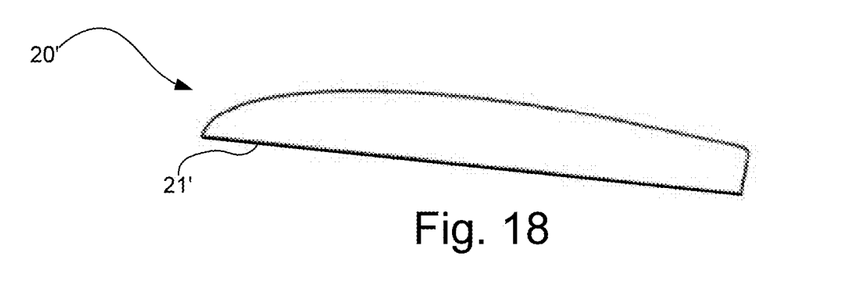
FIG. 18 shows a mounting bracket for mounting a screening arrangement adapted to be attached using the method of the invention, wherein the anchor portion is provided separately at assembly.

FIG. 18 shows an embodiment, wherein the anchor portion 25' is not integral with the mounting bracket 20'. Instead, the anchor portion 25' will be formed during assembly of the window frame 10', by an adhesive. The mounting bracket 20' comprises a connection surface 21' which is adapted to bond with the adhesive 30'. In embodiments where the mounting bracket 20' is made from metal, glass, or other materials which are difficult for adhesives to adhere to, the connection surface 21' of the mounting bracket 20 may be engraved as the connection surface 11' of the window frame, as will be described below.

Figure 19:
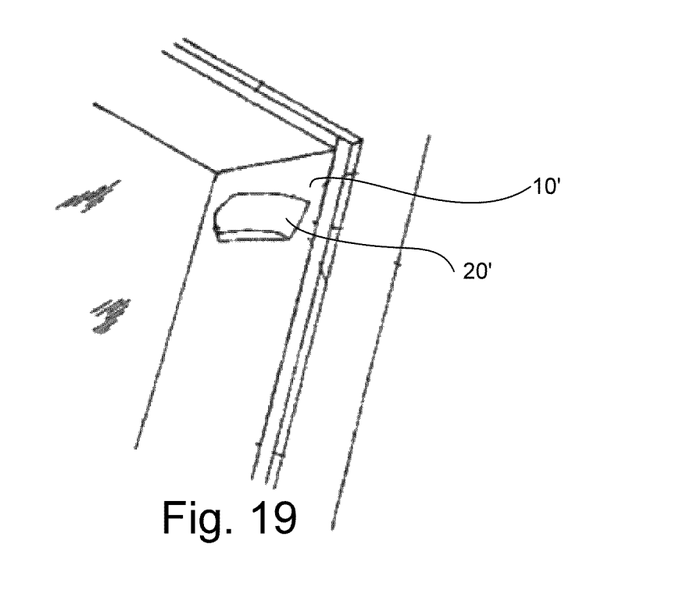
FIG. 19 shows a second window component in the form of a mounting bracket for a screening arrangement attached to a second window component in the form of a window frame, wherein the two window components are attached using the method of the invention.

FIG. 19 shows a mounting bracket attached on a side frame member, in the top corner of a window frame 10'. The window frame would in the delivery condition comprise two such mounting brackets 20' attached symmetrically on opposite side frame members.

Generally, it should be understood throughout the application that the first and second window components 10, 20 may be of different materials such as but not limited to plastics, metals, and glass. However, it is contemplated that the first and the second window components 10, 20 could be made from the same material.

Patent Items

An exemplary use of the method of the invention for connecting window components is described in the following list of enumerated items.

1. A window frame including side, top and bottom frame members surrounding a central window opening, and two mounting brackets attached to respective connection surfaces on the frame members,
characterized in that at least one of the mounting brackets comprise an anchor portion which is retained in at least one angled cavity engraved into the connection surfaces on one of the frame members.

2. A window frame according to item 1, wherein the at least one cavity is engraved using a laser.

3. A window frame according to any of the preceding items, wherein the connection surfaces of the window frame are disposed on respective side frame members.

4. A window frame according to any of the preceding items, wherein the at least one cavity has an angle between 10 to 70 degrees, preferably 20 to 45 degrees, in relation to the normal vector of the connection surface.

5. A window frame according to any of the previous items, wherein each connection surface is engraved with several cavities and at least some of the cavities are angled different from others such that they are not parallel.

6. A window frame according to any of the previous items, wherein the at least one cavity is provided with rough side walls.

7. A window frame according to any of the previous items, wherein the at least one cavity is provided by a continuous groove extending in a spiral pattern.

8. A window frame according to any of the previous items, wherein the at least one cavity forms a pattern in the surface of the window frame, the pattern is chosen from a mesh, grid, circle or a spiral.

9. A window frame according to any of the preceding items, wherein the window frame is made from wood and/or plastic.

10. A window frame according to any of the preceding items, wherein the mounting brackets are made from glass, metal or plastic.

11. A window frame according to any of the previous items, wherein the anchor portion is provided by an adhesive.

12. A window frame according to item 11, wherein the adhesive is an UV-curable adhesive.

13. A window frame according to item 7, wherein the window component has also been engraved with at least one cavity, and the adhesive providing the anchor portion is retained by the at least one cavity on both the plastic covering and the window component.

14. A window frame according to any of the previous items, wherein the anchor portion is an integral portion of the mounting bracket.

15. A window frame according to item 9, wherein the mounting brackets are made from a thermoplastic.

16. A window frame according to any of the previous items, wherein frame members comprise a wooden core with a plastic covering at least a part of the surface of the wooden core, the plastic covering comprising the engraved connection surfaces.

17. A window frame according to item 16, wherein the engraved cavities does not extend through the plastic covering.

The invention claimed is:

1. A method for attaching a first window component to a second window component comprising the steps of:
 a) engraving a surface of the first window component with at least one cavity by subjecting the first window component to a laser beam at a polar angle, $\alpha1$; and
 b) attaching the second window component to the first window component by introducing an anchor portion into the at least one cavity, said anchor portion being an adhesive provided in a layer between the engraved surface of the first window component and the second window component.

2. The method according to claim 1, wherein the at least one cavity is engraved at a polar angle, $\alpha_1$, different from 0 degrees.

3. The method according to claim 1, wherein step a) further comprises engraving the surface with at least one further cavity by subjecting the first window component to a laser beam from a different direction than that used to engrave the at least one cavity, such that the at least one cavity and the at least one further cavity do not extend into the surface of the first window component in parallel directions.

4. The method according to claim 3, wherein the at least one cavity and the at least one further cavity are engraved at the same polar angle, $\alpha1$, but at different azimuth angles.

5. The method according to claim 1, wherein the at least one cavity and/or at least one further cavity form a pattern in the surface of the first window component, the pattern is one of a mesh, grid, circle and a spiral.

6. The method according to claim 1 wherein the first window component is made from glass, metal or plastic.

7. The method according to claim 1, wherein the laser engraving is performed by at least two lasers, wherein the at least two lasers provide a laser beam from different polar and/or azimuth angles on the surface of the first window component.

8. The method according to claim 1, wherein the surface of the second window component facing the adhesive layer is subjected to step a.

9. The method according to claim 8, wherein the adhesive is light-curable adhesive.

10. The method according to claim 1, wherein the method comprises an additional step of pressing the first window component and the second window component against each other during and/or subsequently after step b).

11. A method for attaching a first window component to a second window component comprising the steps of:
 a) engraving a surface of the first window component with at least one cavity by subjecting the first window component to a laser beam at a polar angle, $\alpha1$; and
 b) attaching the second window component to the first window component by applying an adhesive in a fluid form on the first window component wherein the adhesive has a viscosity such that the adhesive flows into and fills the at least one cavity and forms an adhesive layer between the engraved surface of the first window component and the second window component.

12. The method of claim 11 including the further step of:
   a) exposing the fluid adhesive to light to cure the fluid adhesive.

13. The method of claim 11 including the further step of:
   a) exposing the fluid adhesive to UV light to cure the fluid adhesive.

14. A method for attaching a first window component to a second window component comprising the steps of:
   a) engraving a surface of the first window component with at least one cavity by subjecting the first window component to a laser beam at a polar angle, $\alpha 1$; and
   b) attaching the second window component to the first window component by applying a viscous adhesive on the first window component wherein the viscous adhesive has a viscosity such that the viscous adhesive flows into and fills the at least one cavity and forms an adhesive layer between the engraved surface of the first window component and the second window component without heating the viscous adhesive.

15. The method of claim 14 including the further step of:
   a) exposing the fluid adhesive to light to cure the fluid adhesive.

16. The method of claim 14 including the further step of:
   a) exposing the fluid adhesive to UV light to cure the fluid adhesive.

* * * * *